US011778154B2

(12) United States Patent
Chapdelaine-Couture et al.

(10) Patent No.: US 11,778,154 B2
(45) Date of Patent: Oct. 3, 2023

(54) LOW LATENCY CHROMA KEYING EMBEDDED IN A HEAD-MOUNTED DISPLAY FOR MIXED REALITY

(71) Applicant: Apple Inc., Cupertino, CA (US)

(72) Inventors: Vincent Chapdelaine-Couture, Carignan (CA); Anthony Ghannoum, Santa Clara, CA (US); Yan Cote, Notre-Dame-De-L'ile-Perrot (CA); Irving Lustigman, Montreal (CA); Marc-Andre Chenier, Saint-Hyacinthe (CA); Simon Fortin-Deschenes, Sunnyvale, CA (US); Bertrand Nepveu, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 2 days.

(21) Appl. No.: 16/637,087

(22) PCT Filed: Aug. 8, 2018

(86) PCT No.: PCT/US2018/045762
§ 371 (c)(1),
(2) Date: Feb. 6, 2020

(87) PCT Pub. No.: WO2019/032677
PCT Pub. Date: Feb. 14, 2019

(65) Prior Publication Data
US 2020/0252593 A1 Aug. 6, 2020

Related U.S. Application Data

(60) Provisional application No. 62/542,938, filed on Aug. 9, 2017.

(51) Int. Cl.
*G06T 19/00* (2011.01)
*H04N 9/75* (2006.01)
*H04N 13/344* (2018.01)
*H04N 5/265* (2006.01)

(52) U.S. Cl.
CPC ............. *H04N 9/75* (2013.01); *G06T 19/006* (2013.01); *H04N 5/265* (2013.01); *H04N 13/344* (2018.05)

(58) Field of Classification Search
CPC ........ H04N 9/75; H04N 13/344; H04N 5/265; G06T 19/006
USPC ....................................................... 348/587
See application file for complete search history.

(56) References Cited

U.S. PATENT DOCUMENTS

| 9,792,491 | B1 * | 10/2017 | Ramaswamy | ....... G06K 9/6206 |
| 2003/0202120 | A1 | 10/2003 | Eliot | |
| 2014/0321702 | A1 * | 10/2014 | Schmalstieg | ...... G06K 9/00624 382/103 |
| 2016/0148429 | A1 * | 5/2016 | Groppa | ................. G09G 5/026 345/419 |

(Continued)

OTHER PUBLICATIONS

International Search Report for corresponding PCT/US2018/045762 dated Oct. 24, 2018.

*Primary Examiner* — Trang U Tran
(74) *Attorney, Agent, or Firm* — Fernando & Partners, LLP (57) ABSTRACT

A Head-Mounted Display with camera sensors to perform chroma keying in a mixed reality context is presented. Low latency is achieved by embedding the processing in the HMD itself, specifically, format camera images, detect the selected color range and make a composite with the virtual content.

22 Claims, 8 Drawing Sheets

(56) References Cited

U.S. PATENT DOCUMENTS

2016/0261300 A1\* 9/2016 Fei .......................... G06F 3/017

\* cited by examiner

FIGURE 1: SYSTEM OVERVIEW

FIGURE 2: HEAD-MOUNTED DISPLAY

FIGURE 3: DATAFLOW OVERVIEW

FIGURE 4A: EXEMPLARY EMBODIMENT OF THE CHROMA KEYING SETUP FROM THE POINT OF VIEW OF THE HMD

FIGURE 4B: EXEMPLARY EMBODIMENT OF THE CHROMA KEYING SETUP AFTER THE SCREEN COLOR IS REPLACED WITH A VIRTUAL BACKGROUND

FIGURE 5A: EXEMPLARY EMBODIMENT OF THE CHROMA KEYING SETUP FROM THE POINT OF VIEW OF THE HMD

FIGURE 5B: EXEMPLARY EMBODIMENT OF THE CHROMA KEYING SETUP AFTER THE KEY COLOR IS REPLACED WITH VIRTUAL CONTENT

FIGURE 6: EXEMPLARY CHROMA KEYING PROCESSING

FIGURE 7: EXEMPLARY COMPOSITING PROCESS

FIGURE 8:
A NON-RESTRICTIVE ILLUSTRATIVE EMBODIMENT OF THE COLOURED CHROME KEYING SCREEN WITH HIDDEN INFRARED MARKERS

LOW LATENCY CHROMA KEYING EMBEDDED IN A HEAD-MOUNTED DISPLAY FOR MIXED REALITY

CROSS-REFERENCE TO RELATED APPLICATIONS

This application claims priority to U.S. Provisional Patent App. No. 62/542,938, filed on Aug. 9, 2017, which is hereby incorporated by reference in its entirety.

TECHNICAL FIELD

The present disclosure relates to the field of head-mounted displays (HMD) used for applications that immerse in a mixed reality (MR) environment.

BACKGROUND

Chroma keying (or chroma key compositing) is a method for compositing two images by replacing a color range in one image with the content of the second image. It is used in several applications in the field of motion picture or newscasting for instance, often to replace a green (or blue) screen background with a static image or video.

While chroma keying is usually a post-production effect or done live with dedicated equipment/software, it can be applied in the context of augmented reality (AR) headsets, also referred to as mixed reality (MR), where virtual elements are composited in real-time into the real-world environment seen by the user through the head-mounted display. One example is a crane simulator where the controls would be real objects and where a color screen would be replaced by a virtual crane and a virtual environment. Another example would be a social MR experience using a color screen which covers the whole field of view and only the user's hands and/or body are not replaced by virtual content (unless their color is the same as the screen). This example application is sometimes classified as virtual reality (VR) but for simplicity we here consider it as augmented reality (AR).

OBJECTS

An object of the present disclosure is to provide a head-mounted device for mixed reality immersive applications.

An object of the present disclosure is to provide a system for mixed reality immersive applications.

An object of the present disclosure is to provide a method of mixing real environment images with virtual content.

SUMMARY

In accordance with an aspect of the disclosure there is provided a head mounted device for mixed reality immersive applications comprising a processing system composed of a processor, a FPGA and/or a SOC (System on a Chip) and/or GPU for producing virtual content comprising a memory of computer implementable steps; a camera system in communication with the processor system, the camera system providing for capturing real environment images; and a wide-angle lens system positioned in front of a display system in communication with the processing system and with the camera system to show real environment images captured by the camera system mixed and/or augmented with virtual content produced by the processing system thereby providing a mixed reality image; wherein the computer implementable steps comprise: real-time low-latency chroma keying by detecting a user-defined range of color in the real environment images captured by the camera system thereby providing a detected keying masking; compositing the virtual content using the detected keying mask; and displaying the composite virtual content in real time within the mixed reality image via the display system.

In accordance with an aspect of the disclosure there is provided a method of mixing real environment images with virtual content comprising reality immersive applications comprising: producing virtual content; capturing real environment images; detecting in real time a user-defined range of color in the captured real environment images; providing in real time a detected keying mask; compositing in real time the virtual content using the detected keying mask; mixing in real time the composite virtual content and the captured real environment images to provide a mixed reality image; and displaying the mixed reality image.

Other objects, advantages and features of the present disclosure will become more apparent upon reading of the following non-restrictive description of illustrative embodiments thereof, given by way of example only with reference to the accompanying drawings.

DETAILED DESCRIPTION OF ILLUSTRATIVE EMBODIMENTS

Generally stated and in accordance with an embodiment, there is provided a Head-Mounted Display (HMD) including a camera system, image processing units (SoC and/or FPGA systems) and a display system to achieve low latency chroma keying. The chroma keying processing which is embedded in the HMD replaces a user-defined color range in the camera images by computer generated content and shows the result on the display system. Thus, the camera sensors, the processing system and the display system are used to achieve the low latency chroma keying which replaces the user-defined color range in the images of the environment by the computer-generated content. Specifically, the processing system detects the user selected color range and make a composite image with the virtual content.

Generally stated and in accordance with an embodiment, the present disclosure provides for achieving chroma keying inside an HMD used for MR immersive applications. Among such applications, the disclosure is particularly useful in simulations, gaming, entertainment and training. The system achieves mixed reality by having a user look at a display through wide angle lenses (FOV is typically 110° or more). Two cameras located behind the HMD display capture the environment from viewpoints located a few centimetres in front of each eye. Color keying is performed in the HMD by detecting a user-defined range of color in the camera images, compositing virtual content using the detected keying mask and showing the merged result in real-time on the display. To decrease the system latency and jitter, processing the image data on an external computer is avoided. Note that transferring full camera images over the medium transport might not even be feasible due to bandwidth limitations.

The present disclosure provides a wearable immersive head-mounted display (HMD) doing real-time color-keying using embedded stereo RGB cameras to capture the environment and a display system to show real-world images augmented with virtual content. The system runs at a high frame rate (typically 75 fps or more) and it achieves a latency of less than one frame by capturing images and formatting them for display in the HMD itself. Low latency is a key element required to achieve great immersion (often called "Presence"). The color keying processing which is embedded in the HMD detects the selected range of color and mixes in the virtual content coming from the HMD itself or from an external source such as a connected computer. Virtual content can also be composited on top of the color-keyed area to allow mixed-reality content occluding real life objects.

In an embodiment, chroma keying is achieved in a mixed reality system. A low latency computation of the keying mask which defines the pixels to replace is of notable interest, as the final compositing needs to be displayed in real-time at a rate of at least 75 frames per second. If the mask is computed with more than one frame of latency, then any motion in the environment or of the headset creates misalignments between the keying mask and the actual key-colored area to replace. These misalignments are very visible and decrease the quality of immersion. Sending image data to an external computer would increase the latency and thus the probability that the alpha mask does not match with the camera pass-through images. Therefore, the processing is embedded in the HMD to better control the system latency and jitter.

Figure 1:
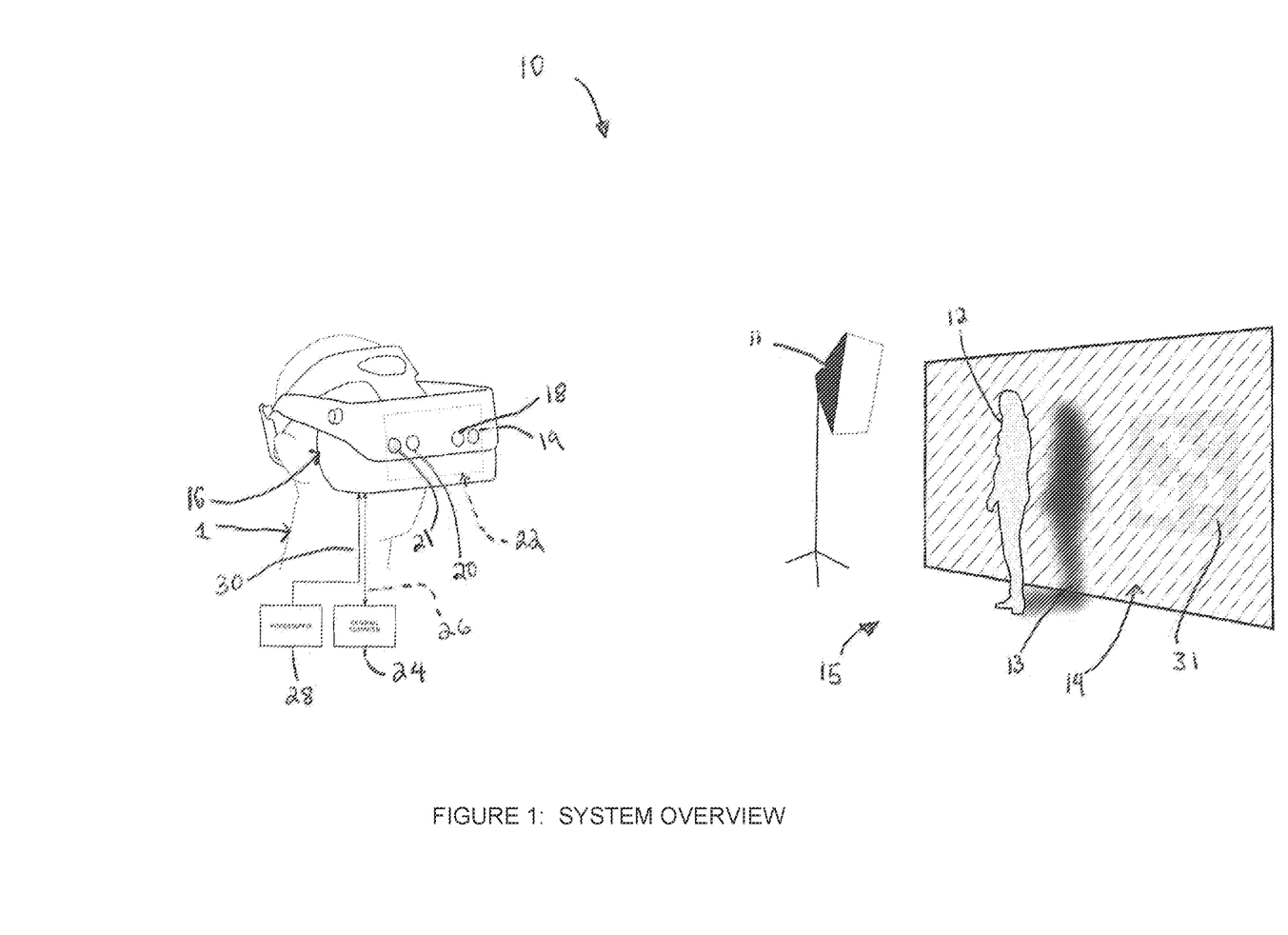
FIG. 1 illustrates an overview of a non-restrictive illustrative embodiment of the chroma keying setup composed here of a coloured screen behind a person. Mixed reality is achieved by having a user look at the setup through a Head-Mounted Display (HMD).

A non-restrictive illustrative embodiment of the chroma keying system 10 is illustrated in FIG. 1. A person 12 is standing in front of a color key screen 14, typically green or blue. Note that due to the lighting 11, the person 12 is casting a shadow 13 on the color screen 14. Mixed reality is realized by using a HMD 16 worn on the head of a user 1 looking at the chroma key setup 15. Two RGB cameras 18 and 20 are integrated into the HMD 16 for a visual pass-through capture of the environment. The HMD 16 performs color keying on the camera images mix in rendered graphics on the display system 22. The graphics rendering may be performed in the HMD 16 itself or in parts on an external computer 24. The optional external connection 26 may be wireless or wired (for instance, a USB cable to send data to the computer 24 and a display port cable to send back graphics to the HMD 16. The power supply 28 and its cable 30 are here illustrated as components external to the HMD but can also be embedded. It should be noted that the rendered graphics may depend on some positional tracking of the headset in the environment. While the positional tracking can be achieved by external tracking systems that use markers on the headset or that use a combination of IR camera sensors on the headset and IR emitting base stations or markers, we here address inside-out positional tracking. This is especially challenging when large color screens are used which exhibit very few visual features to track.

In the embodiment shown in FIG. 1, two additional IR cameras 19 and 21 are integrated into the HMD 16 to perform inside-out positional tracking, with the help of IR visible features or codes 31 on the color screen 13. These features or codes would be invisible in the spectrum captured by the RGB cameras 18 and 20, thus not making the color keying harder to achieve.

Figure 8:
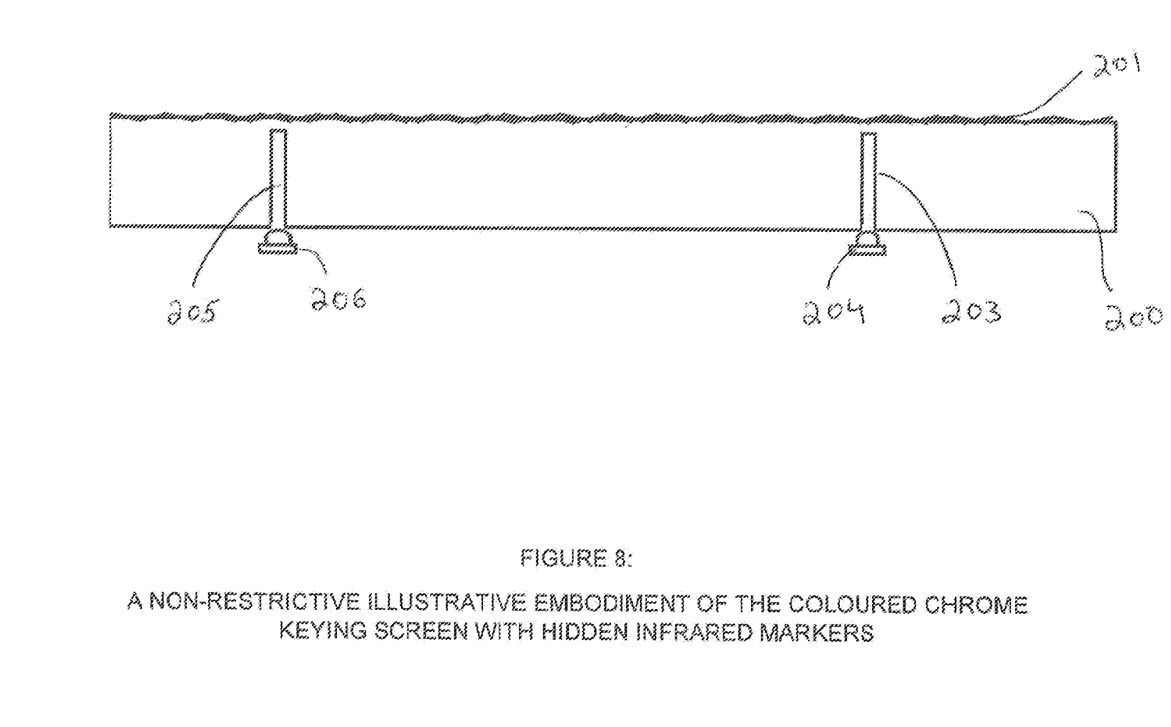
FIG. 8 shows a non-restrictive illustrative embodiment of the colored chrome keying screen with hidden infrared markers.

One way of hiding IR features in the color screen is to use IR light emitting diodes behind the screen. FIG. 8 illustrates this by showing cross-section of the color screen. The color screen is composed of a transparent polymer slab 200 such as acrylic or polycarbonate with a diffuse green of blue painted surface on the front side 201 and drill holes 203, 205 on the back side. The back side of the slab and the interior of the drill holes are rendered IR opaque by the application of paint or an IR opaque material. The bottom of the drill holes, where the polymer is exposed, has a diffuser finish. IR light emitting diodes (LEDs) 204, 206 are placed behind the drill holes so that the bottom of the drill holes act as hidden IR emitting point sources. The holes 203, 205 are drilled almost all the way through the slab 200 to minimize displacement of the point sources due to refraction when seen from the front of the color screen by the tracking camera. Another way of adding IR features onto the color screen is to use an IR pattern projector.

Figure 2:
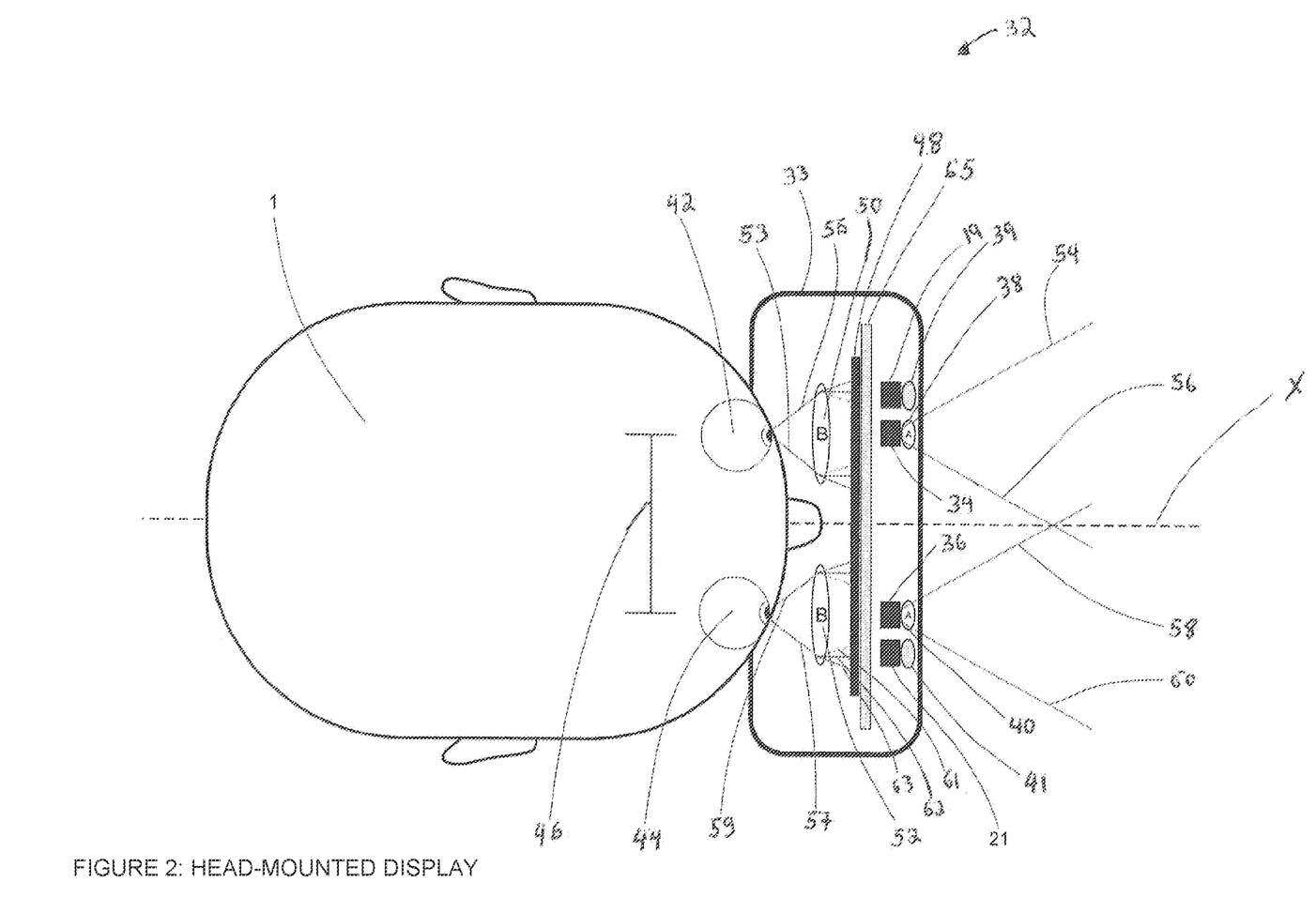
FIG. 2 illustrates a non-restrictive illustrative embodiment of the optics, display and cameras of the mixed reality HMD.

A non-restrictive illustrative embodiment of a Head-Mounted Display system 32 to achieve AR is illustrated in FIG. 2. Two RGB cameras 34, 36 and their associated objective lenses 38, 40, identified as lens A, capture a stereoscopic view of the environment, similarly to the human visual system 42, 44. In an embodiment, the baseline of the cameras is about 64 mm, the average human eye separation 46, and the position of the sensors need to be aligned as much as possible with the user's eyes to minimize incoherence in the user visual perception. The optional IR sensors 19 and 21 and their respective objective lenses 39 and 41, can be separated by a larger distance to increase the perception of depth estimate by triangulation. A user 1 with an HMD 33 looks at a display 48 through wide angle ocular lenses 50, 52 identified as lens B. To simulate a pass-through view X, the images of the cameras are formatted and shown on the display located in front of the eyes, as if the display did not occlude the user's eyes. The non-restrictive illustrative embodiment considers a single OLED display, but other possible types of displays include two smaller displays, micro, flexible or light-field displays. The field of view of the camera lenses 54, 56, 58, 60 must closely match the field of view of the eyes 53, 55, 57, 59. In this embodiment camera lenses do not induce color aberration on the input rays. The display lenses however do produce color aberration, and thus the viewed color rays (for instance, ray 57)

come from different display pixels for each color channel 61, 62, 63. The image processing units that perform image corrections (distortions, chromatic aberrations) and color keying are integrated in a processing board 65.

Figure 3:
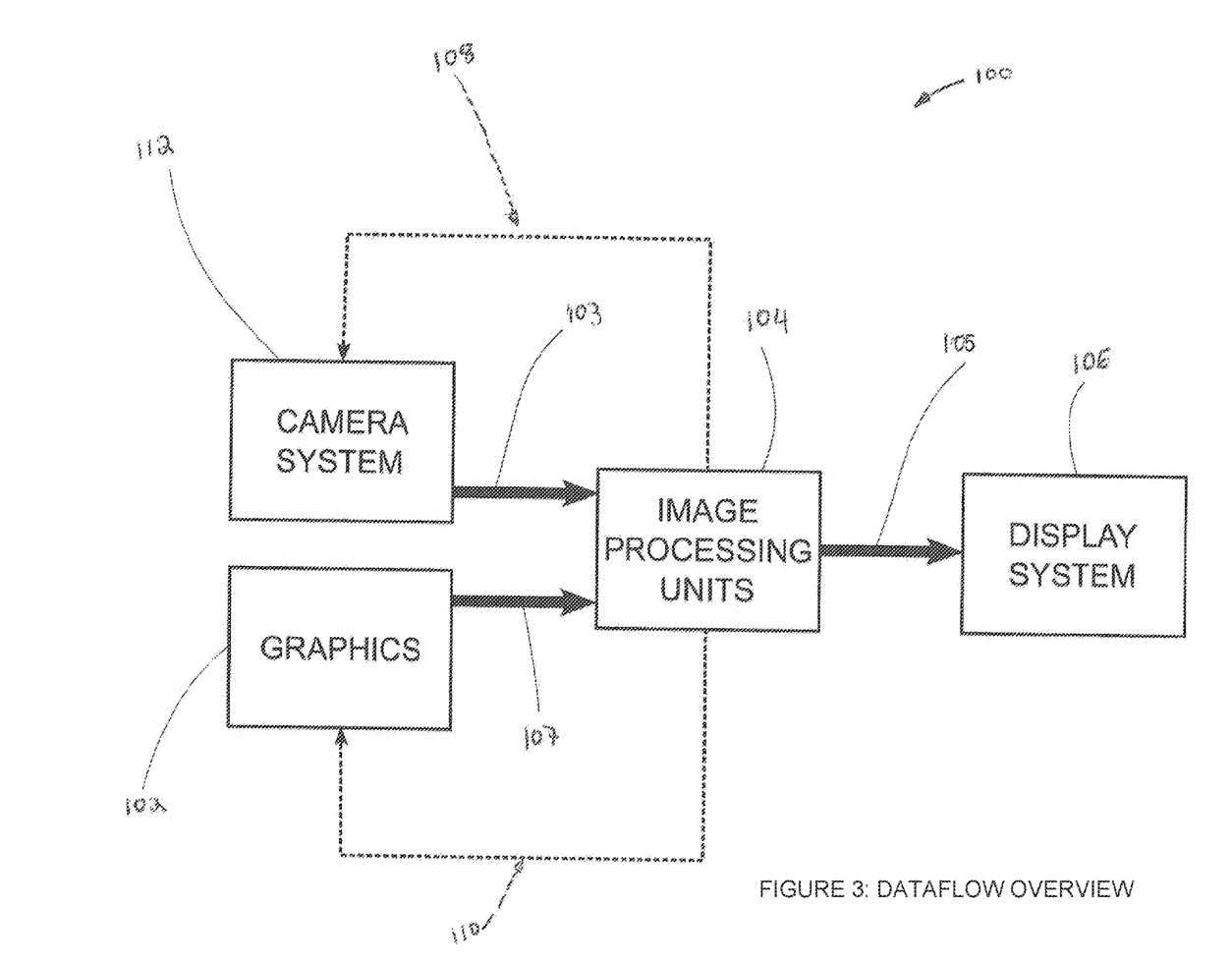
FIG. 3 illustrates a schematic overview of a non-restrictive illustrative embodiment of the dataflow of the present system.

An overview of the dataflow 100 is shown in FIG. 3. The graphic units 102, which could be embedded or external in parts, typically render content such as but not limited to games, videos and virtual objects. The Image processing units 104 detect (from 103) the chroma keying and format camera images to be later composed with rendered graphic (102) into (105) the HMD display system 106. The Image processing units 104 also trigger (108, 110) the clock of the camera system 112 and the graphic rendering for a better synchronicity between them. The optional external connection 107 may be wired (HDMI or Display Port cable, for instance), wireless or a bus between two semiconductor chips or graphic units in a SoC.

Figure 4A:
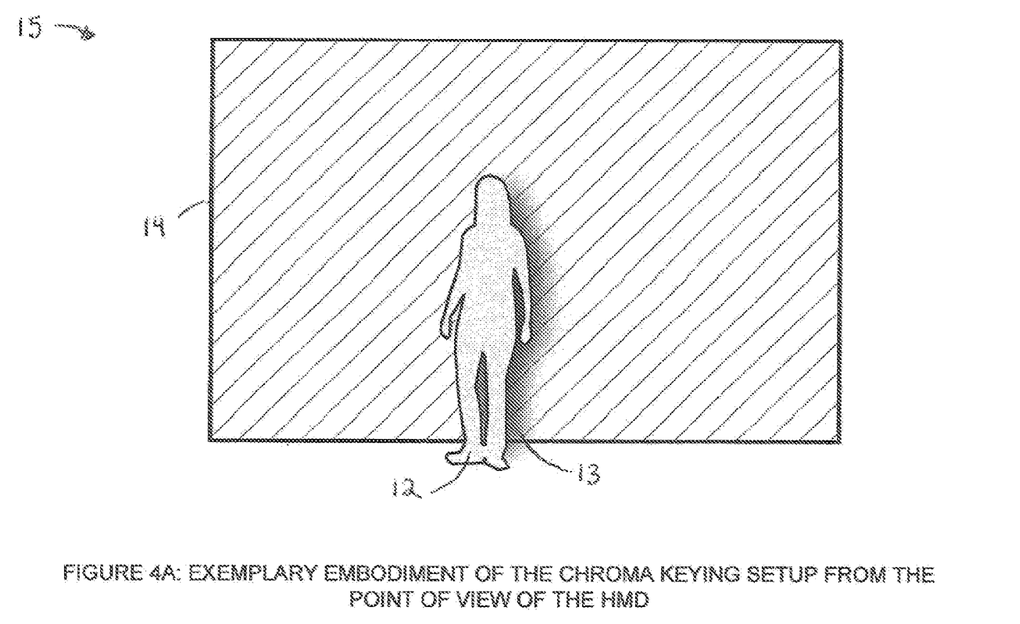
FIG. 4A shows a non-restrictive illustrative embodiment of the chroma keying setup as seen by the cameras of the HMD.

FIG. 4A shows a non-restrictive illustrative embodiment of the chroma keying setup 15 as seen by the camera of the HMD aligned with the left eye (the camera aligned with the right eye has a slightly different point of view but sees a similar setup). A person 12 is standing in front of a green or blue screen 14 illustrated as a shaded area. It is of note that the chroma keying method needs to be robust enough to handle the shadow 13 created on the colored screen by the lighting.

Figure 4B:
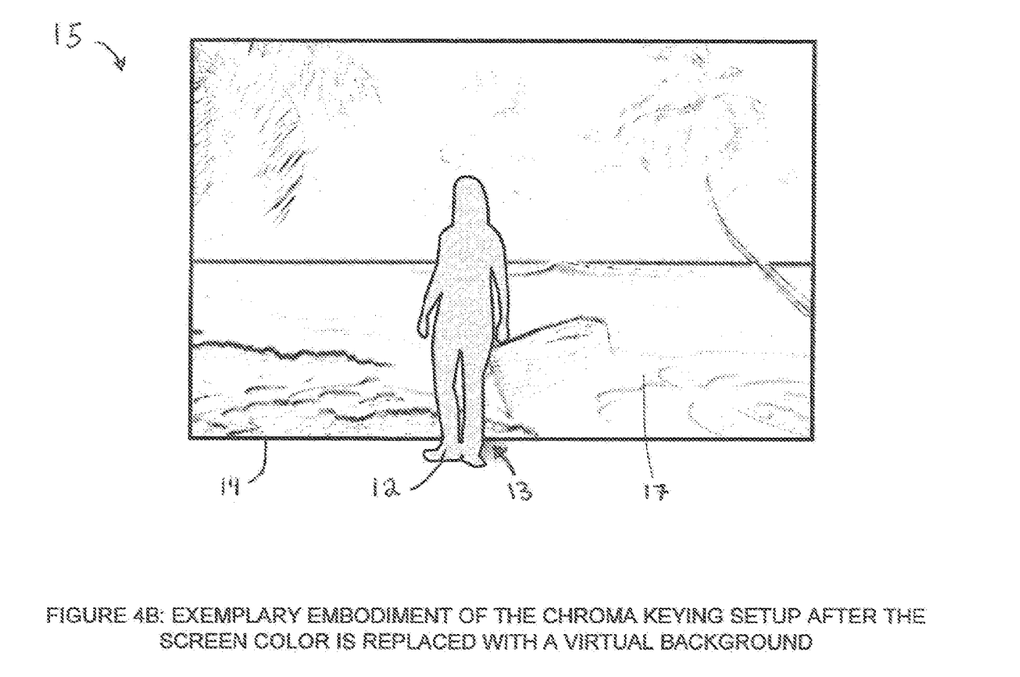
FIG. 4B shows a non-restrictive illustrative embodiment of the chroma keying setup as displayed in the HMD, after the key screen is replaced with a virtual background.

FIG. 4B shows the chroma keying setup 15 as displayed in the HMD for the left eye, after the key screen 14 and the visible shadow 13 are replaced with a virtual background 17. The displayed image for the right eye (not shown in the figure) is very similar, but corresponds to a slightly different point of view to produce a stereoscopic view.

Figure 5A:
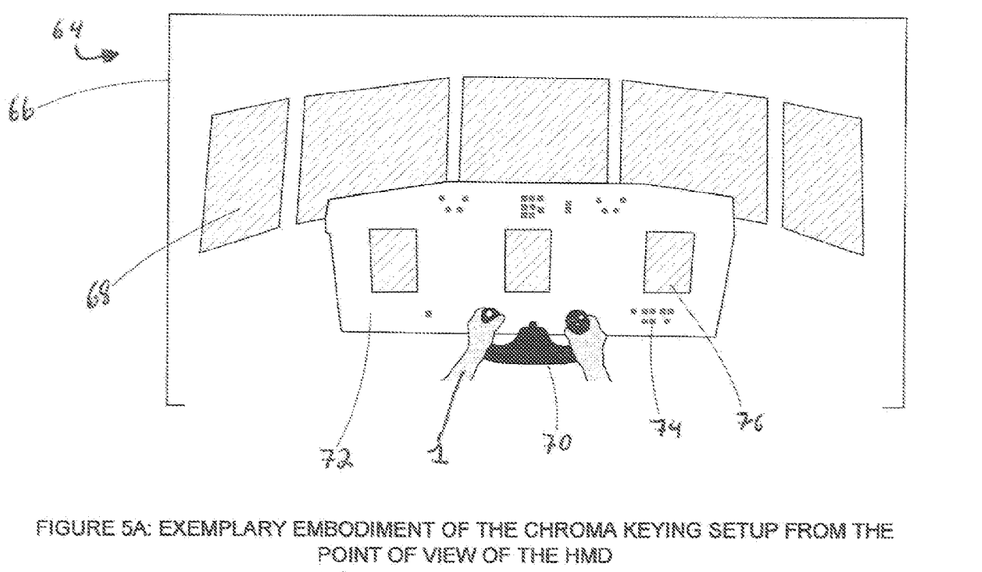
FIG. 5A shows a non-restrictive illustrative embodiment of the chroma keying setup as seen by the cameras of the HMD.

FIG. 5A shows a non-restrictive illustrative embodiment of a chroma keying setup 64 as seen by the camera of the HMD aligned with the left eye (the camera aligned with the right eye has a slightly different point of view but sees a similar setup). The user 1 is sitting inside a cockpit 66 with green or blue windows 68 illustrated as shaded areas. The control wheel 70, the control panel 72 and its buttons 74 are real, but the display panels are colored in green or blue.

Figure 5B:
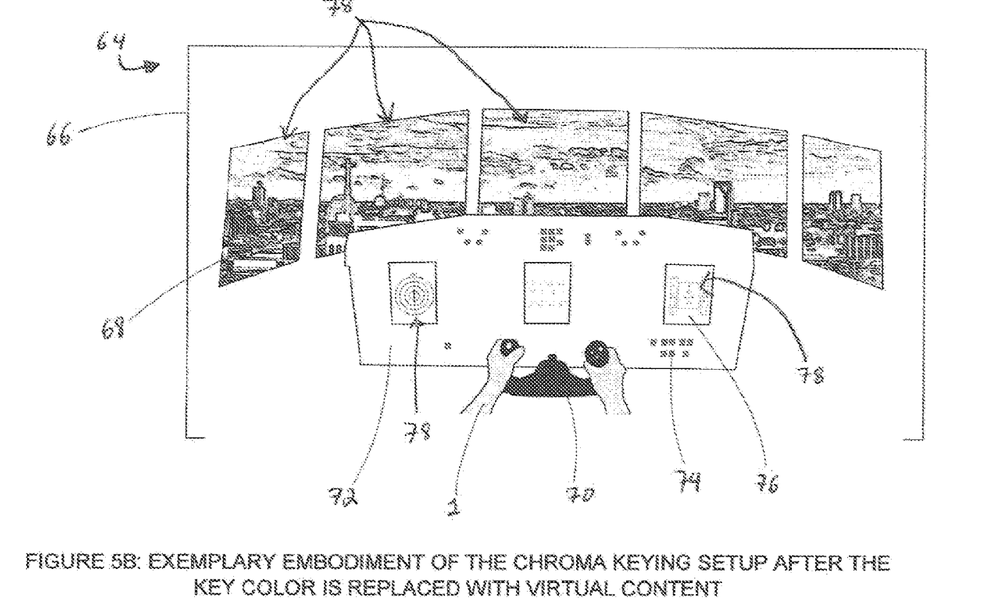
FIG. 5B shows a non-restrictive illustrative embodiment of the chroma keying setup as displayed in the HMD, after the key color is replaced with virtual content.

FIG. 5B shows the chroma keying setup as displayed in the HMD for the left eye, after the windows and control displays have been replaced with virtual content 78. The displayed image for the right eye (not shown in the figure) is very similar, but corresponds to a slightly different point of view to produce a stereoscopic view.

Figure 6:
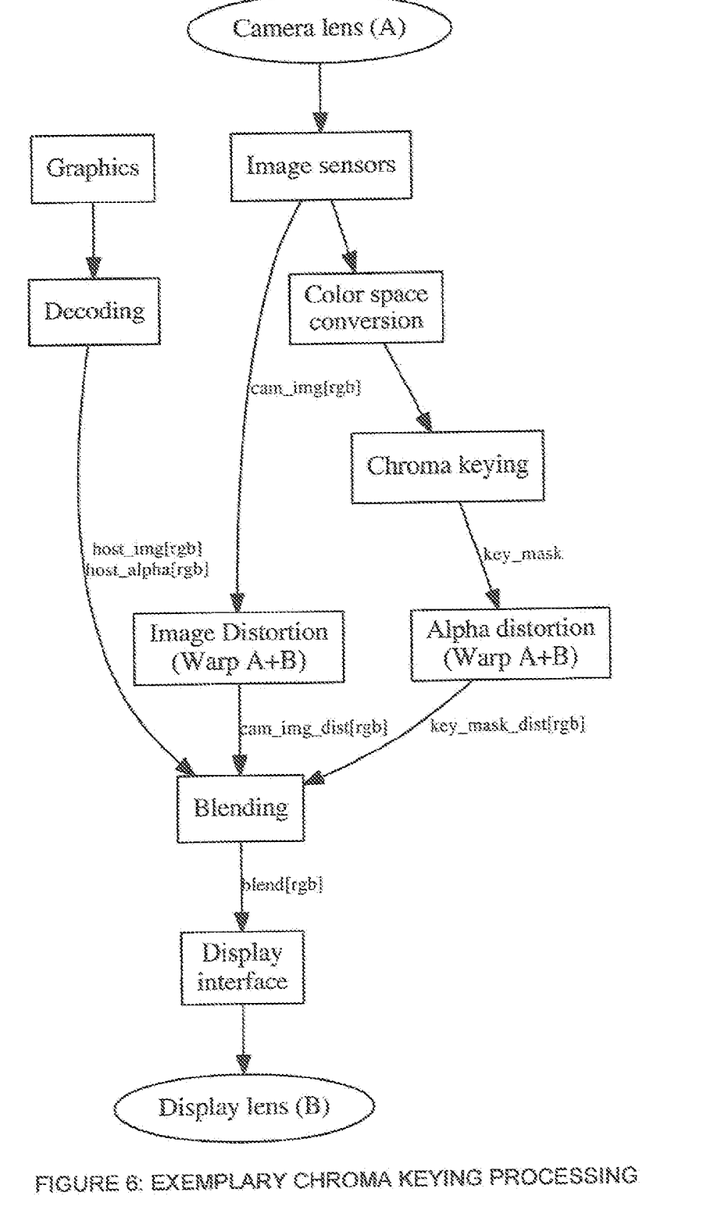
FIG. 6 shows the processing steps done in the HMD in accordance with a non-restrictive illustrative embodiment.

FIG. 6 shows the processing steps done in the HMD. The key map is identified from the camera images by defining a color range that corresponds to the screen color. The key detection is done on the camera images directly after debayering as they are not affected by chromatic aberrations in the illustrated embodiment. Correction of color aberration in the camera images might be necessary in some embodiments. A color conversion from the RGB format to a more perceptually relevant format such as HSL is applied in a preprocessing step to improve the color segmentation. While the camera lenses used in the illustrated embodiment (FIG. 2 lens A) do not induce any chromatic aberrations, the display lenses (FIG. 2 lens B) do suffer from chromatic aberrations. Color keying has to be done at a stage that has no chromatic aberrations, otherwise the color components of a single pixel (x,y) position would not reflect the real world color. Thus, in this embodiment, the camera images, graphics images (Host input) and the key map need to be distorted differently for each color channel because the display lenses create significant chromatic aberrations. The distortion is applied in one pass, as multiple distortions applied serially may cause degradation in image quality due to pixel interpolation and image scale changes.

An automatic exposure adjustment of the camera sensors is applied to avoid image saturation (over exposure) which introduces artifacts in the color keying mask.

Post-filtering of the key mask can also be applied to reduce noise. For instance, morphological filters (dilate/erode) or blob detection/removal are often used to filter out random peaks in the chroma keying mask. Mask feathering (edge smoothing) may also be required to create a more believable blending effect.

Figure 7:
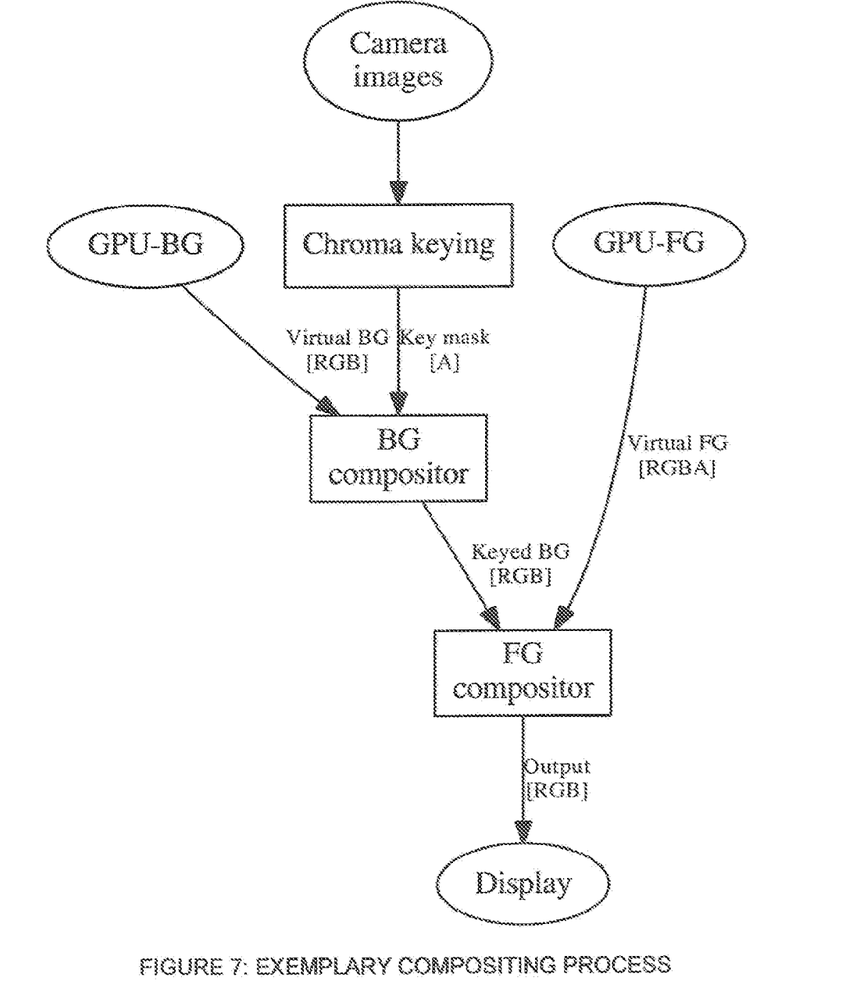
FIG. 7 shows the compositing process done in the HMD in accordance with a non-restrictive illustrative embodiment.

FIG. 7 shows how virtual content can be composited on top of a chroma keyed background. This mode is called "Color-Keying with Transparency". The compositing process with transparency also needs to be performed in the HMD to achieve low latency as it requires the chroma key map as input. A first compositor generates the background (BG) by using as inputs a rendered virtual background, the chroma key mask and the camera images. This compositor outputs a keyed background that selects either the camera image or the virtual background based on the key mask, or a mixture of the two if the mask supports semi-transparency. A second compositor takes as input a virtual foreground (FG) with a transparency layer and mixes it with the keyed background. Note that the rendering of the virtual content can be performed on the same GPU (i.e. GPU-BG and GPU-FG can be the same), but then if this GPU is external to the HMD, then the amount of raw graphics data transferred to the HMD is increased as both the background and the foreground need to be sent. Another embodiment might have a distributed design with GPU-BG in an external computer and GPU-FG in the HMD.

The various features described herein can be combined in a variety of ways within the context of the present disclosure so as to provide still other embodiments. As such, the embodiments are not mutually exclusive. Moreover, the embodiments discussed herein need not include all of the features and elements illustrated and/or described and thus partial combinations of features can also be contemplated. Furthermore, embodiments with less features than those described can also be contemplated. It is to be understood that the present disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation. Hence, although the present disclosure has been provided hereinabove by way of non-restrictive illustrative embodiments thereof, it can be modified, without departing from the scope, spirit and nature thereof and of the appended claims.

The invention claimed is:

1. A method comprising:
   at a head-mounted device including an image sensor, a display, and one or more processors:
   capturing, via the image sensor, a live image of a real environment;
   performing chromatic aberration correction on the live image, using the one or more processors, to generate a processed image;
   obtaining, using the one or more processors, content to be rendered in association with the processed image of the real environment;

detecting, using the one or more processors, a first portion of the processed image of the real environment within a color range;
obtaining, using the one or more processors, a keying mask based on the first portion of the processed image of the real environment;
filtering, using the one or more processors, the keying mask to generate a filtered keying mask corresponding to a second portion of the processed image of the real environment;
modifying, using the one or more processors, the second portion of the processed image of the real environment with the content based on the filtered keying mask, in order to generate a display image; and
displaying, on the display, the display image.

2. The method of claim 1, wherein a latency between capturing the live image of the real environment and displaying the display image is less than a frame at a frame rate of at least 75 frames per second.

3. The method of claim 1, wherein the head-mounted device includes a communications interface, and obtaining the content includes receiving the content via the communications interface.

4. The method of claim 3, wherein the live image of the real environment is not transmitted via the communications interface.

5. The method of claim 3, wherein neither the live image of the real environment nor the display image is received via the communications interface.

6. The method of claim 1, wherein the head-mounted device includes one or more positional tracking sensors generating positional tracking data, wherein the content is based on the positional tracking data.

7. The method of claim 6, wherein the positional tracking sensors include one or more infrared sensors.

8. The method of claim 1, further comprising, before detecting the first portion of the processed image of the real environment within the color range, performing, using the one or more processors, image processing of the live image of the real environment.

9. The method of claim 8, wherein the image processing includes at least one of debayering or color format conversion.

10. The method of claim 1, wherein filtering the keying mask includes performing noise reduction of the keying mask.

11. The method of claim 10, wherein the noise reduction includes at least one of a morphological filter, blob removal, or edge smoothing.

12. The method of claim 1, wherein generating the display image includes compositing the processed image of the real environment and the content based on the filtered keying mask.

13. The method of claim 1, wherein generating the display image includes replacing the second portion of the processed image of the real environment with the content.

14. The method of claim 1, wherein the keying mask indicates a subset of pixels of the processed image of the real environment, and wherein the subset of pixels corresponds to the second portion of the processed image of the real environment.

15. The method of claim 1, wherein the keying mask is a chroma keying mask.

16. A head-mounted device comprising:
an image sensor to capture a live image of a real environment;
one or more processors to:
perform chromatic aberration correction on the live image to generate a processed image;
obtain content to be rendered in association with the processed image of the real environment;
detect a first portion of the processed image of the real environment within a color range;
obtain a keying mask based on the first portion of the processed image of the real environment;
filter the keying mask to generate a filtered keying mask corresponding to a second portion of the processed image of the real environment;
modify the second portion of the processed image of the real environment with the content based on the filtered keying mask, in order to generate a display image; and
a display to display the display image.

17. The head-mounted device of claim 16, wherein a latency between capturing the processed image of the real environment and displaying the display image is less than a frame at a frame rate of at least 75 frames per second.

18. The head-mounted device of claim 16, further comprising a communications interface, wherein the head-mounted device receives the content via the communications interface.

19. The head-mounted device of claim 18, wherein the processed image of the real environment is not transmitted via the communications interface.

20. The head-mounted device of claim 16, further comprising one or more positional tracking sensors generating positional tracking data, wherein the content is based on the positional tracking data.

21. The head-mounted device of claim 20, wherein the positional tracking sensors include one or more infrared sensors.

22. A non-transitory computer-readable medium having instructions encoded thereon which, when executed by one or more processors of a head-mounted device including an image sensor and a display, cause the head-mounted device to:
capture, via the image sensor, a live image of a real environment;
perform chromatic aberration correction on the live image, using the one or more processors, to generate a processed image;
obtain, using the one or more processors, content to be rendered in association with the processed image of the real environment;
detect, using the one or more processors, a first portion of the processed image of the real environment within a color range;
obtain, using the one or more processors, a keying mask based on the first portion of the processed image of the real environment;
filter, using the one or more processors, the keying mask to generate a filtered keying mask corresponding to a second portion of the processed image of the real environment;
modify, using the one or more processors, the second portion of the processed image of the real environment with the content based on the filtered keying mask, in order to generate a display image; and
display, on the display, the display image.

* * * * *